Oct. 19, 1937.                 J. L. COX                    2,096,693
                LUMINESCENT COATING FOR ELECTRIC LAMPS
                         Filed April 3, 1937
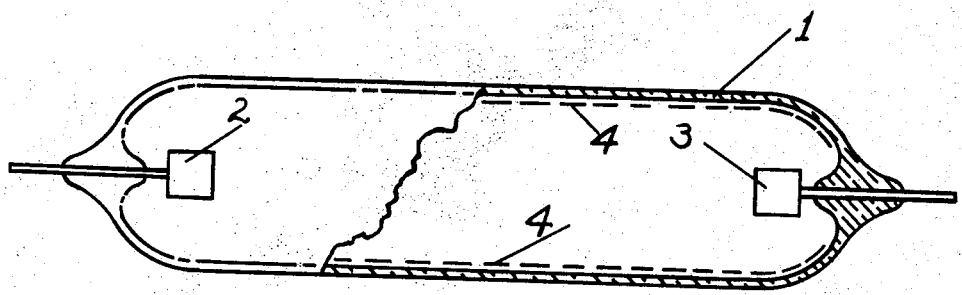
INVENTOR:
JAMES L. COX.
BY:
Lawrence Burns,
ATTORNEY.

Patented Oct. 19, 1937

2,096,693

UNITED STATES PATENT OFFICE 2,096,693

LUMINESCENT COATING FOR ELECTRIC LAMPS

James L. Cox, Danvers, Mass., assignor to Hygrade Sylvania Corporation, Salem, Mass., a corporation of Massachusetts Application April 3, 1937, Serial No. 134,969

3 Claims. (Cl. 176—122)

The present invention relates to fabricated glass articles, such as bulbs or tubes for electric lamps generally, and more particularly the invention relates to luminescent bulbs or tubes for electric lamps, and to methods of manufacture thereof.

Luminescent material has heretofore been applied to the inner surface of lamp bulbs or tubes by first coating the surface with a glycerine binder or with a transparent enamel, then dusting on the luminescent material, thereafter heating the glass to the softening point to remove the volatile parts of the binder and to cause the luminescent particles to sink into the glass surface, adhering thereto. Such a process tends to produce an unevenly luminescent surface, because of the difficulty of the dusting operation. Such dusting is especially difficult, if not practically impossible, in the case of glass tubing bent to the complicated patterns used in neon signs. In such cases the coating of the tube must be done before the tubing is shaped, which is not always desirable. Furthermore, the luminescent coating has a short life.

The object of the present invention is to provide a more firmly-adherent coating which is uniformly and brightly luminescent, and which is easily applied. The methods used heretofore required dusting of the luminescent material on the surface of a binder. The material could not be mixed with the binder and applied directly, because a uniform coating could not be produced and because the binders were not transparent to ultraviolet radiation, upon the action of which such materials usually depend. Furthermore, the particle size of the luminescent material is important in determining the brightness, and the size would usually be incorrect with the binders used.

The new and novel process of the present invention greatly simplifies the application of luminescent coatings on the interior of a lamp bulb or tube. The luminescent material is mixed with a novel binder, producing a mixture of syrup-like consistency which can be directly applied to the inner surface of the glass. This mixture is poured over the inner surface to be coated, shaken around if desired and the excess drained off. If desired, the article to be coated may be arranged with its longitudinal axis vertical, the novel mixture being poured over its surface at the top and allowed to drain downward, thus covering the entire surface. Because of the viscosity of the mixture, the rate of draining is slow. The coating produced in such a manner will not show streaks nor unevenness.

When the excess has drained off, and the coating is fairly dry, the bulb or tube is heated to a temperature near the softening point of the glass. At first, the coating will turn black, due to the carbonization of the binding material. As the heating is continued in the presence of oxygen, or of air, the carbon will be oxidized and lost as a gas, leaving only the luminescent material in a firmly adhering film on the glass, or partially imbedded in the glass.

The drawing shows a side view, partly in section, of a lamp with an internal coating according to the invention.

Referring to the drawing the lamp comprises a container 1 having electrodes 2 and 3 sealed into the ends thereof. These electrodes may be thermionic if desired. The container has the porous layer 4 (indicated by the broken lines in the figure) of luminescent material on its inner surface. The container will usually comprise a gaseous filling, at any desired pressure, of an inert gas such as argon and a quantity of mercury. The radiation from the discharge strikes the luminescent surface, causing the latter to give off visible light.

For providing the fluorescent coating a mixture of binder and fluorescent material which is desirable for my process can be made as follows: 4 grams of dry nitrocellulose of about 1000 seconds viscosity is dissolved in 100 cc. of amyl acetate. To 100 cc. of this mixture is added enough fluorescent material to make a thick syrup-like mixture which is stirred to a uniform consistency. Usually about 50 grams of the luminescent material will be required. This mixture of itself will not adhere properly to the glass, so a plastic sizing agent, such as n-butyl phthalate should be added to the acetate-nitrocellulose mixture, preferably before the luminescent material is added. A few drops of the n-butyl phthalate will generally be sufficient.

The proportions given above can be varied considerably without affecting the invention. Air bubbles which tend to form in the mixture can be removed by placing the mixture for a time in vacuum before applying to the glass. These bubbles will tend to spoil the finished surface, if not removed. They may also be removed, without the evacuation, by pouring the mixture in a fine stream on the surface to be coated.

The nitrocellulose used must be of high viscosity in order to keep the particles of luminescent material in suspension long enough for the coating to be applied. Low viscosity binders tend to separate from the luminescent material while the coating is being applied, producing unevenness.

It will be noted from the foregoing description of my process that my coating is initially a suspension of luminescent material in a high viscosity binder. This is applied to the desired surface and dried. The surface then contains a layer, or preferably several layers, of luminescent particles, with the binder filling the interstices between particles. The first heating step decomposes the binder, leaving a carbon residue in the interstices between luminescent particles. The next step, further heating, preferably to a temperature higher than that of the first step, in an atmosphere containing oxygen, oxidizes the carbon to a gaseous compound causing it to disappear from the interstices of the luminescent coating. I thus obtain a porous coating, preferably several layers thick, of luminescent material. The porosity produces a greater brightness of the luminescent surface, because it enables full utilization of the exciting light to produce luminescence. The exciting light which penetrates one layer will be absorbed by the next. Any visible light emitted by luminescence in the interstices will reach the surface, by a reflection from the good reflecting surface for visible light which the fluorescent materials provide. The number of layers should be enough to utilize as much as possible the exciting light without losing too much visible emission by the absorption occurring at the successive reflections.

My novel process is seen to differ sharply from the methods known in the art, methods which first coat the surface with a volatile binding material, then dust on fluorescent material thereafter removing the volatile material by heating. Such a process does not immerse the fluorescent material in the binder, and does not pass through a stage in which the luminescent coating contains particles of carbon which can be removed by oxidation to leave a porous coating.

The character of the surface produced by my coating thus differs sharply from that product by methods heretofore known, by virtue of the porosity just described.

The viscosity, for the nitrocellulose, given in seconds is the time required, in the given liquid, for a standard steel ball to drop 10 inches.

A fluorescent of phosphorescent material may be considered as a luminescent material for the purpose of this invention. Typical materials are calcium tungstate, zinc sulphide, zinc-silicate, zinc-cadmium sulphide and magnesium molybdate, although any other luminescent material may be used. If desired, of course, several such materials may be used together.

What I claim, and desire to secure by Letters Patent, is:

1. A process for applying luminescent material to the interior of the container of an electric lamp device which comprises the steps of coating the inner surface of said container with a suspension of luminescent material in a high viscosity binder, heating until the binder turns brown, and then heating in the presence of oxygen until this brown color disappears.

2. A process for applying luminescent material to the interior of the container of an electric lamp device which comprises the steps of coating the inner surface of said container with a suspension of luminescent material in a high viscosity binder heating until the binder decomposes with a carbon residue, and thereafter heating in the presence of oxygen until the carbon is burned away.

3. A gaseous electric discharge lamp comprising a sealed transparent container, electrodes sealed therein, gaseous atmosphere therein, and a porous coating of luminescent material on the inside surface of said container.

JAMES L. COX.